United States Patent [19]

Hira et al.

[11] Patent Number: 4,902,040
[45] Date of Patent: Feb. 20, 1990

[54] GUIDE RAIL MOUNTING ASSEMBLY FOR AUTOMOTIVE PASSIVE SEAT BELT SYSTEM

[75] Inventors: Kazumi Hira; Kenro Otsuka, both of Yokohama; Shunichi Kiyono, Fujisawa, all of Japan

[73] Assignees: Nissan Motor Company, Limited, Yokohama; NSK-Warnar Kabushiki Kaisha, Tokyo, both of Japan

[21] Appl. No.: 100,819

[22] Filed: Sep. 25, 1987

[30] Foreign Application Priority Data

Sep. 26, 1986 [JP] Japan .............................. 61-146524[U]

[51] Int. Cl.$^4$ ............................................. B60R 21/10
[52] U.S. Cl. ..................................... 280/804; 297/469; 297/473
[58] Field of Search .............. 280/802, 804; 16/94 R; 403/329, 397

[56] References Cited

U.S. PATENT DOCUMENTS

| 1,856,235 | 5/1932 | Bittorf | 16/94 R |
| 2,879,561 | 3/1959 | Rieder | 403/329 |
| 3,468,509 | 9/1969 | Foltz | 16/94 R |
| 4,671,537 | 6/1987 | Yoshitsugu | 280/804 |
| 4,711,468 | 12/1987 | Yoshitsugu | 280/804 |

Primary Examiner—Kenneth R. Rice
Attorney, Agent, or Firm—Foley & Lardner, Schwartz, Jeffery, Schwaab, Mack, Blumenthal & Evans

[57] ABSTRACT

A mounting assembly comprises a rigid bracket having an essentially U-shaped portion and an elastic plate, the tip of which is fixed to the tip of the bracket. A guide rail of a passive seat belt system is inserted into a space between the inner surface of the shaped portion and the elastic plate to be secured to a vehicle body by a bolt.

21 Claims, 2 Drawing Sheets

GUIDE RAIL MOUNTING ASSEMBLY FOR AUTOMOTIVE PASSIVE SEAT BELT SYSTEM

BACKGROUND OF THE INVENTION

1. Field of the Invention

The present invention relates to a mounting assembly for mounting a member on a stationary base, particularly to a mounting assembly for mounting a long member, such as a guide rail for an automotive passive seat belt system which can automatically cause a seat belt to move between a fitted position, in which the occupant is restricted by means of a seat belt, and a release position, in which the occupant is released from the seat belt, when the occupant is getting in and out of a vehicle.

2. Description of the Background Art

In passive seat belt systems, the occupant is automatically restricted by means of the seat belt after the occupant sits down in the seat. In some passive seat belt systems, a guide rail is mounted on the roof side rail of the vehicle body. The guide rail has the front end located adjacent a front pillar and the rear end terminating adjacent a center pillar of the vehicle body. A sliding block can slidably engage the guide rail. The sliding block slides along the guide rail between the front and rear ends of the guide rail to carry one end of a seat belt. The other end of the seat belt is connected to a retractor which is fixedly secured to the side of a seat near the longitudinal center of the vehicle body, so that the seat belt may be wound onto the retractor. The sliding block is also secured to one end of an actuation wire and the other end of the actuation wire is drivingly accociate with a drive motor for driving the sliding block along the guide rail. Therefore, one end of the seat belt can move along the guide rail according to the movement of the sliding block which is driven by the drive motor via the actuation wire. The movement of the sliding block is controlled by means of a control circuit. In addition, a latch base is provided at the rear end of the guide rail. When the sliding block is moved from the front end of the guide rail, i.e. the release position, to the position of the latch base, i.e. the fitted position, an engaging portion, which is provided at the tip of the sliding block, is latched by means of the latch base. The movement of the sliding block is finished at this position, so that the occupant is restricted by means of the seat belt.

In the background of the present invention, a guide rail mounting bracket for mounting the guide rail on the vehicle body comprises a gripping portion having an essentially C-shaped cross section. The guide rail to be mounted on the vehicle body is clamped by the gripping portion. The gripping portion is formed by bending a resilient spring steel plate. In order to secure the mounting bracket to the vehicle body, the mounting bracket is provided with an essentially U-shaped mounting portion. The mounting portion is formed by making an essentially U-shaped split at essentially the center of the gripping portion and by bending a part of the gripping portion upwardly along the line connecting the both ends of the split. In addition, an opening is formed in the mounting portion. A bolt or the like is inserted into the opening, so that the mounting bracket is secured to the vehicle body. This kind of guide rail mounting member is described in the Japanese Patent Second Publication (Tokko) Showa 61-61263. In cases where the guide rail is mounted on the vehicle body by means of this mounting member, there are the following disadvantages. When a strong pull is given to the seat belt at positions other than the rear end of the guide rail where the sliding block is latched on the latch base, the gripping portion of the mounting member opens so that the guide rail is released from the bracket since the bracket is made of a resilient material. It is also noted that a trimming, which covers the guide rail, is caused to protrude.

Therefore, the mounting member has to be formed by a high-rigidity member so that the gripping portion can not open easily. however, when the mounting member is rigid, the clamping of the guide rail is complicated and it is required that the accuracy of the mounting member is as high as possible.

SUMMARY OF THE INVENTION

It is therefore a principal object of the present invention to eliminate the aforementioned disadvantages and to provide a mounting assembly for mounting a member on a stationary base, which can firmly secure the member to the stationary base.

It is a further object of the present invention to provide a mounting assembly for mounting a guide rail of a seat belt system on a vehicle body, which can firmly secure the guide rail to the vehicle body.

It is a further object of the present invention to provide a mounting assembly in which the guide rail can be easily mounted on the vehicle body to decrease man-hours used in assembly.

it is a still further object of the present invention to provide a mounting assembly which does not require a higher degree of manufacturing accuracy.

In order to accomplish the aforementioned and other specific objects, a mounting assembly for mounting a member on a stationary base, according to the present invention, comprises a rigid bracket having an essentially U-shaped bending portion and an elastic plate, one end of which is provided with an engaging portion. The tip of the bracket engages the engaging portion to clamp the member between the bending portion and the elastic plate so as to secure the member together with the mounting assembly to the stationary base by means of a bolt which passes through an opening provided in the end of the bracket and the elastic plate.

According to one aspect of the present invention, the mounting assembly comprises:

a rigid bracket including a bending portion, the inner surface of which comes into contact with surfaces of the member other than the surface thereof where the member is brought into contact with the stationary base, and a first plate portion extending parallel to the surface of the stationary base, on which the member is to be secured; and an elastic member including a second plate portion extending parallel to the surface of the first plate portion of the bracket, and an engaging portion which is provided at one end of the second plate portion thereof and which engages the end of the first plate portion of said bracket so as to form a space, in which the member is inserted to be fixed, between the inner surface of the bending portion of the bracket and the plate portion of the elastic member.

The bracket is preferably provided with at least one rib at the verge thereof in order to reinforce the bracket. The first and second plate portions are secured to the stationary base by means of a bolt. The bending portion may have an essentially U-shaped section so as to form the space. The member has an essentially rectangular section. In this case, the bracket is preferably provided with a projecting portion at an opposing end to the engaging portion so that the projecting portion extends essentially perpendicular to the second plate portion to form the space. The member may be a guide rail, on which a sliding block can be slid. In this case, the tip of the projecting portion is preferably located at a predetermined distance from the tip of the bending portion so as to allow the sliding block to slide on the guide rail. The guide rail may be secured to the stationary base by means of a plurality of mounting assemblies. The mounting assembly may mount a guide rail for a seat belt system, such as a passive seat belt system, on a vehicle body.

According to another aspect of the present invention, the process for mounting a member on a stationary base comprises the steps of:

preparing a mounting assembly including a rigid bracket, which has a bending portion and a first plate portion, and an elastic member, which has a second plate portion and and engaging portion, each of the first and second plate portions being provided with an opening in which a bolt is inserted;

engaging the tip of the first plate portion with the engaging portion so that opening of the first plate portion corresponds to that of the second plate portion;

inserting the member into a space between the inner surface of the bending portion and the second plate portion of the elastic member so as to bring the outer surface of the member into contact with the inner surface of the bending portion and the second plate portion; and engaging the bolt with the opening to secure the mounting assembly to the stationary base.

The bracket is preferably provided with at least one rib at the verge thereof so as to reinforce the bracket. The member may have an essentially rectangular section. In this case, the bracket may be provided with a projecting portion at opposing end to the engaging portion, the projecting portion extending essentially perpendicular to the second plate portion, so as to form the space. The member may also be a guide rail, on which a sliding block is slid. In this case, the tip of the projecting portion is preferably apart from the tip of the bending portion at a predetermined distance so as to allow the sliding block to slide on the guide rail. The first and second plate portions may be secured to the stationary base by means of a bolt. The guide rail may be secured to the stationary base by means of a plurality of mounting assemblies. The guide rail may be used in a seat belt system, such as a passive seat belt system.

DESCRIPTION OF THE PREFERRED EMBODIMENT

Figure 1:
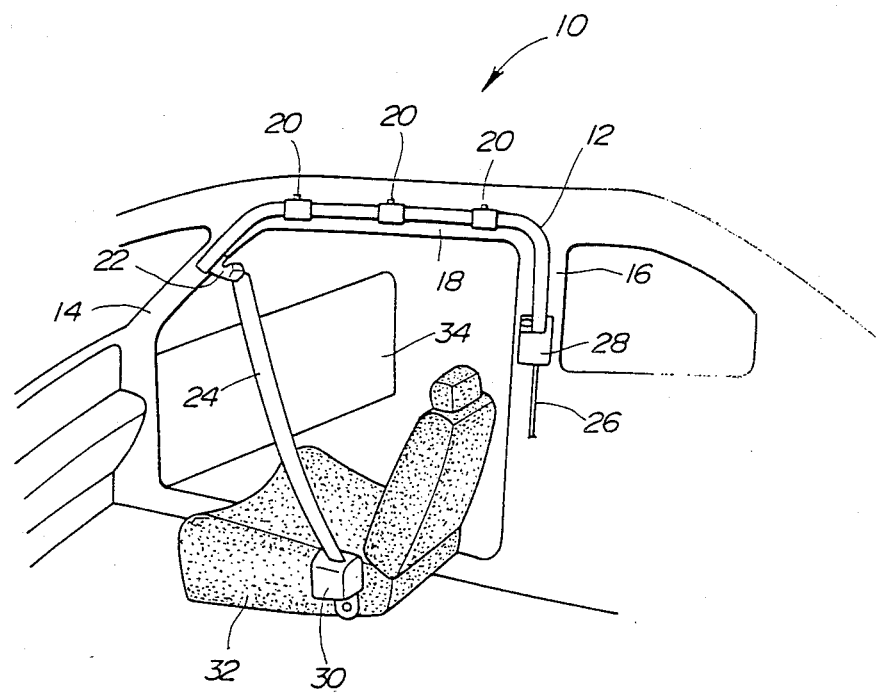
FIG. 1 is a schematic view of a seat belt system.

Referring now to the drawings, particularly to FIG. 1, a seat belt system, in which amounting assembly of the present invention is used, is described below.

As shown in FIG. 1, a guide rail 12, which is, for example, made of an aluminum, on the roof side rail of a vehicle body 10. The guide rail 12 has the front end located adjacent a front pillar 14 and the rear end terminating adjacent a center pillar 16 of the vehicle body 10. The guide rail 12 is secured to the vehicle body 10 by means of a plurality of mounting assemblies 20. A sliding block 22 can slidably engage the guide rail 12. The sliding block 22 slides along the guide rail 12 between the front and rear ends of the guide rail 12. The sliding block 22 is connected to one end of a seat belt 24 to carry the one end thereof. The other end of the seat belt 24 is connected to a retractor 30 which is fixedly secured to the side of a seat 32 near the longitudinal center of the vehicle body 10. The seat belt 24 may be wound onto the retractor 30 in per se well known manner. The sliding block 22 is also secured to one end of an actuation wire 26, for example, a spiral wire. The actuation wire 26 is movable along the guide rail 12. The other end of the actuation wire 26 is drivingly cooperated with a drive motor not shown. Various driving mechanism may be taken for drivingly coupling the actuation wire 26 to the drive motor. For example, the portion of the actuation wire 26 may be disigned to mesh with a drive pinion or gear to be driven in axial direction of the actuation wire 26. Therefore, one end of the seat belt 24 can move along the guide rail with the sliding block 22 when the actuation wire 26 is driven by the drive motor. When the vehicular door opens, the sliding block 22 is positioned at the front end of the guide rail 12. At this sliding block position, the seat belt 24 is held away from the corresponding seat to allow a passager to get in and out of the vehicle cabin. On the other hand, when the door is closed, the sliding block 22 is held at the rear end of the guide rail 12. At this position, the seat belt 24 is held to be fitted on a vehicular seat occupant. In addition, a latch means 28 is provided at the rear end of the guide rail 12. When the sliding block 22 arrives at the rear end of the guide rail 12, the sliding block 22 engages the latch means 28 to be fixed at the rear end of the guide rail 12.

In this system, when the occupant opens the door 34 of the vehicle body 10, the sliding block 22 is moved toward the front end of the guide rail 12 by means of the drive motor so that the occupant can easily get in the vehicle to sit down on the seat 32. When the sliding block 22 arrives at the front end of the guide rail 12, electrical current is supplied to the drive motor, so that the sliding block is stopped. In this state, when the occupant gets in the vehicle and closes the door, the sliding block 22 begins to move toward the rear end of the guide rail 12. When the sliding block 22 arrives at the rear end of the guide rail 12, the electrical current supplied to the drive motor is cut off, so that the sliding block 22 is stopped. At this position, the sliding block 22 engages the latch means 28 to be fixed, so that the occupant can be restricted by means of the seat belt 24.

Figure 2:
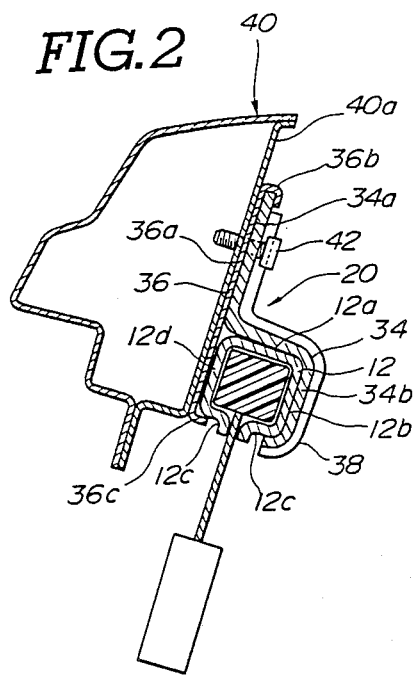
FIG. 2 is a section of the preferred embodiment of a mounting assembly used in the seat belt system in FIG. 1, according to the present invention.

FIG. 2 shows the preferred embodiment of a guide rail mounting assembly according to the present invention. The mounting assembly 20 comprises a bracket 34 and an elastic member 36. The bracket 34 is made of spring steel and comprises a plate portion 34a and a shaped or bent portion 34b which covers the upper surface 12a, the side surface 12b and a part of the lower surface 12c of the guide rail 12. In addition, the bracket 34 is provided with a pair of ribs 38 on both verges thereof in order to reinforce or strengthen the bracket 34. The elastic member 36 comprises a plate portion 36a, an engaging portion 36b which engages the upper end of the plate portion 34a of the bracket 34, and a projecting portion 36c which covers a part of the lower surface 12c of the guide rail 12. The upper surface 12a, the side surfaces 12b and 12d and a part of the lower surface 12c of the guide rail 12 are covered with the bracket 34 and the elastic member 36. The bracket 34 and the elastic member 36 are mounted on a side roof rail 40 of the vehicle body 10 by means of a bolt 42, which passes through an opening formed in the plate portion 34a of the bracket 34 and the plate portion 36a of the elastic member 36, so that the plate portion 36a of the elastic member 36 comes into contact with an inner panel 40a of the side roof rail 40.

The installation of the guide rail is described bellow.

Figure 3:
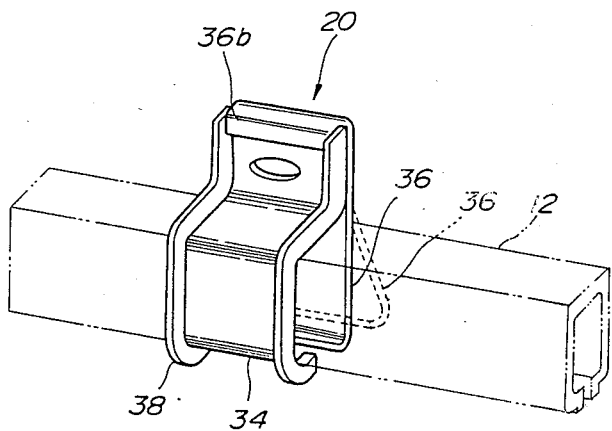
FIG. 3 is a perspective view showing the installation of the guide rail shown in FIG. 2.

The previously mentioned engagement between the engaging portion 36b of the elastic member 36 and the upper end of the plate portion 34a of the bracket 34 is performed so that they are fixed to each other. Next, the elastic member is bent as expressed by the phantom line in FIG. 3 so that the distance between the lower ends of the bracket 34 and the elastic member 36 is increased in order to insert the guide rail 12 into a space between the bracket 34 and the elastic member 36. After the guide rail 12 is inserted into the space to engage the bracket 34, the elastic member 36 is moved toward the bracket 34 due to the elastic force of the elastic member 36. Similar to the operation, the guide rail 12 is inserted into the spaces of a plurality of mounting assembles 20. Thereafter, the plate portion 34a of the bracket 34 and the plate portion 36a of the elastic members 36 are fixed to the side roof rail 40 by means of a bolt 42. After the mounting assembly 20 is fixed to the side roof rail 40, the displacement of the elastic member 36 can not be performed since the elastic member 36 is fixed between the side roof rail 40 and the bracket 34. In addition, the guide rail 12 can be firmly fixed to the vehicle body 10 so as not to be able to move since the rigidity of the bracket 34 is high.

What is claimed is:

1. A mounting assembly for mounting a member on a stationary base, which comprises:
    a rigid bracket including an upper planar portion and a lower shaped portion shaped to support said member; and
    elastic means including an upper portion for engaging the upper planar portion of the rigid bracket and a lower portion for being deformed away from said bracket sufficient for inserting said member into the shaped portion and toward said bracket sufficient for retaining said member in said shaped portion.

2. A mounting assembly as set forth in claim 1, wherein said bracket is provided with at least one rib at the verge thereof, said rib reinforcing said bracket.

3. A mounting assembly as set forth in claim 1, wherein said bracket and said elastic means are secured to said stationary base by means of a bolt.

4. A mounting assembly as set forth in claim 2, wherein said bracket and said elastic means are secured to said stationary base by means of a bolt.

5. A mounting assembly as set forth in claim 2, wherein said bending lower portion has an essentially U-shaped cross section so as to form said space.

6. A mounting assembly as set forth in claim 5, wherein said member has an essentially rectangular cross section.

7. A mounting assembly as set forth in claim 6, wherein said elastic member means is provided with a projecting portion at the opposite end to an engaging portion.

8. A mounting assembly as set forth in claim 7, wherein said member is a guide rail, on which a sliding block is slid, and wherein a tip of said projecting portion is separated from a tip of said shaped portion by a predetermined distance so as to allow said sliding block to slide on said guide rail.

9. A mounting assembly as set forth in claim 8, wherein said bracket and said elastic means are secured to said stationary base by means of a bolt.

10. A mounting assembly as set forth in claim 8, wherein said guide rail is secured to said stationary base by means of a plurality of said mounting assemblies.

11. A mounting assembly as set forth in claim 9, wherein said guide rail is secured to said stationary base by means of a plurality of said mounting assemblies.

12. A mounting assembly as set forth in claim 11, wherein said guide rail is sued in a seat belt system.

13. A mounting assembly as set forth in claim 12, wherein said guide rail is used in a passive seat belt system.

14. A process for mounting a member on a stationary base, which comprises the steps of:
    preparing a mounting assembly including a rigid bracket, which has an upper plate portion and a lower shaped portion, and an elastic member, which has an upper portion and a lower portion, each of said upper plate and said upper portions being provided with an opening in which a bolt is inserted;
    engaging a tip of said upper plate portion with said upper portion so that said opening of said upper plate portion corresponds to that of said upper portion;
    deforming said lower portion away from said lower plate portion;
    inserting said member into a space between inner surfaces of said lower shaped portion and lower portion of said elastic member; and
    engaging said bolt with said opening to secure said mounting assembly to said stationary base.

15. A process for mounting a member on a stationary base as set forth in claim 14, wherein said bracket is provided with at least one rib at the verge thereof so as to reinforce said bracket.

16. A process for mounting a member on a stationary base as set forth in claim 15, wherein said member has an essentially rectangular cross section.

17. A process for mounting a member on a stationary base as set forth in claim 16, wherein said bracket is provided with a projecting portion at an opposing end to an engaging portion.

18. A process for mounting a member on a stationary base as set forth in claim 17, wherein said member is a guide rail, on which a sliding block is slid, and wherein a tip of said projecting portion is separated from the tip of said shaped portion by a predetermined distance so as to allow said sliding block to slide on said guide rail.

19. A process for mounting a member on a stationary base as set forth in claim 18, wherein said guide rail is secured to said stationary base by means of a plurality of said mounting assemblies.

20. A mounting assembly as set forth in claim 19, wherein said guide rail is used in a seat belt system.

21. A mounting assembly as set forth in claim 20, wherein said guide rail is used in a passive seat belt system.

* * * * *